United States Patent [19]
Sabet et al.

[11] Patent Number: 5,324,182
[45] Date of Patent: Jun. 28, 1994

[54] ROTATING PISTON INTERNAL COMBUSTION ENGINE WITH RING GEAR ELASTICALLY COUPLED TO THE HOUSING

[75] Inventors: Huschang Sabet, Maybachstr. 16, W-7000 Stuttgart 30; Dietrich Eckhardt, Aichwald, both of Fed. Rep. of Germany

[73] Assignee: Huschang Sabet, Stuttgart, Fed. Rep. of Germany

[21] Appl. No.: 741,488

[22] PCT Filed: Jan. 10, 1990

[86] PCT No.: PCT/EP90/00047
  § 371 Date: Sep. 13, 1991
  § 102(e) Date: Sep. 13, 1991

[87] PCT Pub. No.: WO90/08879
  PCT Pub. Date: Aug. 9, 1990

[30] Foreign Application Priority Data
  Feb. 3, 1989 [DE] Fed. Rep. of Germany ....... 3903197

[51] Int. Cl.[5] ............................................. F01C 1/077
[52] U.S. Cl. ........................................ 418/34; 418/36; 418/179; 475/347
[58] Field of Search ............................ 418/34, 36, 179; 475/347; 403/291

[56] References Cited
U.S. PATENT DOCUMENTS
1,060,865 5/1913 Sundh ................................. 475/347

FOREIGN PATENT DOCUMENTS
2648151 5/1977 Fed. Rep. of Germany ...... 475/347
3516604 11/1986 Fed. Rep. of Germany ...... 475/347
901960 7/1962 United Kingdom ................. 475/347

*Primary Examiner*—John J. Vrablik
*Attorney, Agent, or Firm*—Kenyon & Kenyon

[57] ABSTRACT

A rotation piston internal combustion engine has a substantially stationary housing defining a plurality of blind holes, and a rotor rotatably mounted within the housing for rotation at a substantially uniform velocity about an axis. A hub has four pistons and is rotatably mounted within the rotor for rotation about the axis at a non-uniform velocity. Four crankshafts are each rotatably mounted through a respective rib of the rotor and coupled to a respective gear wheel so that the gear wheel rotates with the crankshafts. A ring gear is coupled to the housing for engaging the gear wheels to permit rotation of the gear wheels relative to the housing. The ring gear has a plurality of apertures having a second diameter, each corresponding in position to a respective blind hole in the housing. The ring gear is elastically coupled to the housing via a plurality of connector bolts mounted so that one end of each connector bolt is engaged in a blind hole of the housing and the other end of each connector bolt is engaged in a corresponding aperture of the ring gear with a tight fit, and each connector bolt has an elastic coating over the end engaged in the blind hole of the housing.

9 Claims, 4 Drawing Sheets

ROTATING PISTON INTERNAL COMBUSTION ENGINE WITH RING GEAR ELASTICALLY COUPLED TO THE HOUSING

BACKGROUND OF THE INVENTION

The invention relates to a rotation piston internal combustion engine with a rotor which rotates at uniform velocity within a stationary cylindrical housing, with at least four ribs essentially directed radially inward from a cylindrical outside wall of the rotor, with a hub rotating concentrically to the rotor inside the rotor, at non-uniform velocity, with at least four pistons projecting radially beyond the hub at equal radial angles from one another, engaging with the interstice between each of two ribs, and performing an oscillation motion relative to these, with at least four crankshafts which pass through the ribs of the rotor axially and can be put into rotary motion by the oscillation motion of the pistons, by means of connecting rods, and with gear wheels arranged on the crankshafts so as not to rotate, which mesh with a ring gear which has gear teeth on the inside and is elastically connected with the housing.

A rotation piston internal combustion engine of this type is known (EP-A-00351136), in which a light and compact construction is ensured in that the crankshafts are passed through the ribs of the rotor. To avoid unbalanced conditions, the crankshafts have to be arranged point-symmetrically to the axis of rotation of the rotor, so that for an engine with four pistons, four crankshafts also have to be provided. Here, the crankshafts are mounted in friction bearings within the rotor. Therefore, very little play is left available at the crankshafts to balance out dimensional deviations in the production and assembly of the connecting rods. If the dimensional deviations are greater than the available play in the case of one or more connecting rods, this results in irregular stress on the connecting rods and, therefore, an out-of-round movement of the gear wheels, which can result in the risk of gear tooth damage, especially at high engine output and high speeds of rotation. In order to avoid this, the stresses are absorbed by an elastic element arranged between the ring gear and the housing mantle. In the known rotation piston internal combustion engines, sleeves inserted in frontal end bores of the ring gear to hold bolts which engage with adjacent bores of the housing cover with their ends that project beyond the ring gear, are used as an elastic element. Studies have shown, however, that the elastic sleeves are not able to withstand the stresses of engine operation, particularly at high engine output and high speeds of rotation. The damage to the sleeves which occurs in this connection is primarily attributable to excessive surface pressure. Causes for this were determined to be the shock-like stresses which occur during the movement of the four gear wheels, on the one hand, and a difference in thermal expansion of the housing cover and the ring gear, on the other hand. The difference in thermal expansion results in constant compression of the sleeves in the radial direction during operation, with the tangential, shock-like stresses being superimposed on them. The invention is based on the task of improving the known rotation piston internal combustion engine of the type stated initially in such a way that the reciprocal stresses which occur between the ring gear and the housing cover can be permanently absorbed.

To accomplish this task, it is proposed, according to a first alternative of the invention, that the parts of the connector bolts which engage with the blind holes of the housing cover are provided with a coating of rubber elastic material, and the parts of the connector bolts which project beyond the housing cover engage with the frontal end bores of the ring gear with a tight fit. With this measure, what is achieved is that the stresses which result from the static redundancies in the case of more than three connecting rods can be permanently absorbed by the rubber elastic coating on the parts of the connector bolts which engage with the blind holes of the housing cover. A further improvement in this regard is achieved if the parts of the cylindrically formed connector bolts which engage with the blind holes of the housing cover have a greater diameter than the parts which engage with the bores of the ring gear. The rubber elastic coating should lie close against the wall and the base of the blind hole in question in the unstressed state. It is advantageous if the rubber elastic coating is connected with the connector bolts in such a manner that it cannot be removed, preferably vulcanized onto them.

In order to furthermore be able to reduce the stresses which are attributable to the surface pressures resulting from the difference in thermal expansion of the ring gear and the housing cover, it is proposed, according to a preferred structure of the invention, that the hole circle diameter of the blind holes in the housing cover, which preferably consists of light metal, is smaller than the hole circle diameter of the bores in the ring gear, which is made of hardened steel. It is practical if the diameters of the hole circles are selected in such a manner that they are essentially the same at operating temperature.

A second solution variation of the invention provides that at least one damping layer of rubber elastic material, provided between surfaces of the ring gear and a housing cover which lie opposite one another leaving a gap, bridges the gap and connects the ring gear with the housing cover. Advantageously, the surfaces which lie opposite one another and are connected with one another by the damping layer form a circumference or surface gearing between the ring gear and the housing cover. The damping layer can either be composed of parts arranged in pieces at a distance from one another, or be formed as a connected layer which extends over the entire gap length or the gap circumference. Advantageously, the damping layer is vulcanized in between the surfaces of the ring gear and the housing cover which lie opposite one another.

Pursuant to a further advantageous structure of the invention, the ring gear is secured against axial displacement by means of a locking ring, preferably structured as an open spring ring, arranged in a circumferential inside groove of the housing. In this case, it is practical if the inside groove demonstrates twice the width of the locking ring.

BRIEF DESCRIPTION OF THE DRAWINGS

In the following, the invention is explained in greater detail on the basis of embodiments shown schematically in the drawings. This shows.

DETAILED DESCRIPTION

Figure 1:
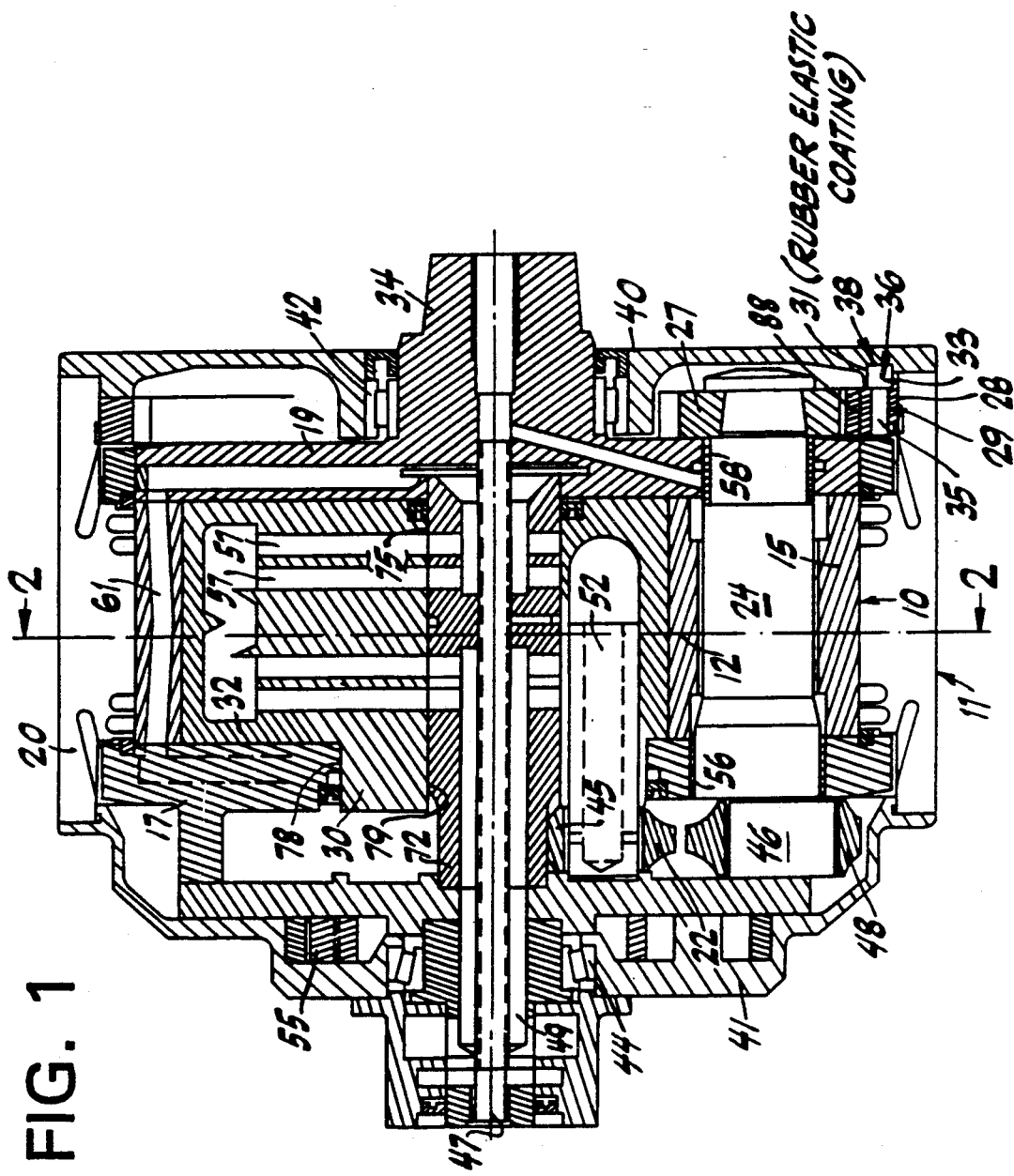
FIG. 1 shows a longitudinal cross-section through a rotation piston internal combustion engine in two cross-sectional planes, forming an angle with one another, along the cross-sectional line 1—1 of FIG. 2.

The rotation piston internal combustion engine essentially consists of a stationary housing 11, preferably consisting of aluminum, a rotor 10 which rotates within this at uniform velocity, as well as a hub 30 mounted in the rotor and rotating at non-uniform velocity, with four wing-shaped pistons 32 which project radially away to the outside. The cylindrical outside wall 15 of the rotor 10, which is provided with inlet and outlet openings, together with two frontal side parts 17 and 19 which are connected by the outside wall 15, delimits the combustion chambers 73, 74, the volume of which is decreased and then increased again by the movement of the pistons 32 back and forth between four ribs 12 which are directed inward and which are connected with the outside wall 15. The fuel which is injected simultaneously into two combustion chambers via two opposite inlet openings 80 is compressed between the pistons 32 and the side walls 14 of the ribs 12 by the oscillation movement, and ignited by two spark plugs 84 screwed into the housing mantle 84. Gasket rings 64 and gasket strips 66 seal the combustion chambers 73, 74 off from the housing 11 as well as from each other. The expanding combustion gases drive the pistons 32 and the ribs 12 away from one another and escape through the outlet openings 82. The relative movement between the pistons 32 and the rotor 10 is transmitted to the crank pins of four crankshafts 24 which pass axially through the ribs 12, by means of four connecting rods 22 jointed to bolts 52 of the hub 30, and thereby converted into a rotational movement. Gear wheels 27 connected with the crankshafts 24 on the frontal side mesh with the teeth 88 of a ring gear 28 which has gear teeth on the inside and is connected with the housing 11, and thereby convert the rotational movement of the crankshafts 24 into a rotational movement of the rotor 10 relative to the housing 11. The rotor rotation can be transmitted to a consumer device by means of a power take-off shaft connected in one piece with the frontal side part 19 and mounted in the bearings 42, 44 of the housing covers 40 and 41.

In the frontal side parts 17 and 19, which are connected by the outside wall 15 as well as by an axially arranged piston shaft 72, the crankshafts 24 are mounted in friction bearings 56 and 58. The large eye 48 of one of four connecting rods 22 is pushed onto each of the crank pins 46 of the crankshafts 24, while the small eye 45 of each connecting rod is connected with a bolt 52 set into the hub 30. The hub 30 is friction-mounted on the piston shaft 72. The piston shaft narrows slightly, conically, in the direction of the connecting rod side, so that there is greater bearing play in the area 79 than in the area 75. In order to be able to absorb the bearing play, the bore 78 in the frontal side part 17 demonstrates a corresponding excess dimension as compared with the outside diameter of the hub in the area in question. Because of the increased bearing play, the hub 30 is not forced to be centered in the plane in which the connecting rods 22 are jointed on. Its axis of rotation is defined by three of the four connecting rods 22, and can deviate from the center axis of the rotor in case of occurrence of dimensional deviations during production and/or assembly, within the scope of these dimensional deviations. The axis of rotation of the hub 30 becomes statically redundant by means of the fourth connecting rod. Dimensional deviations of the connecting rods 22 can therefore result in non-uniform stress on the connecting rods 22, the crankshafts 24 and the gear wheels 27, and therefore of the ring gear 28. In order to absorb and damp these stresses, the ring gear 28 is connected with the housing cover 40 in an elastic manner.

Figure 2:
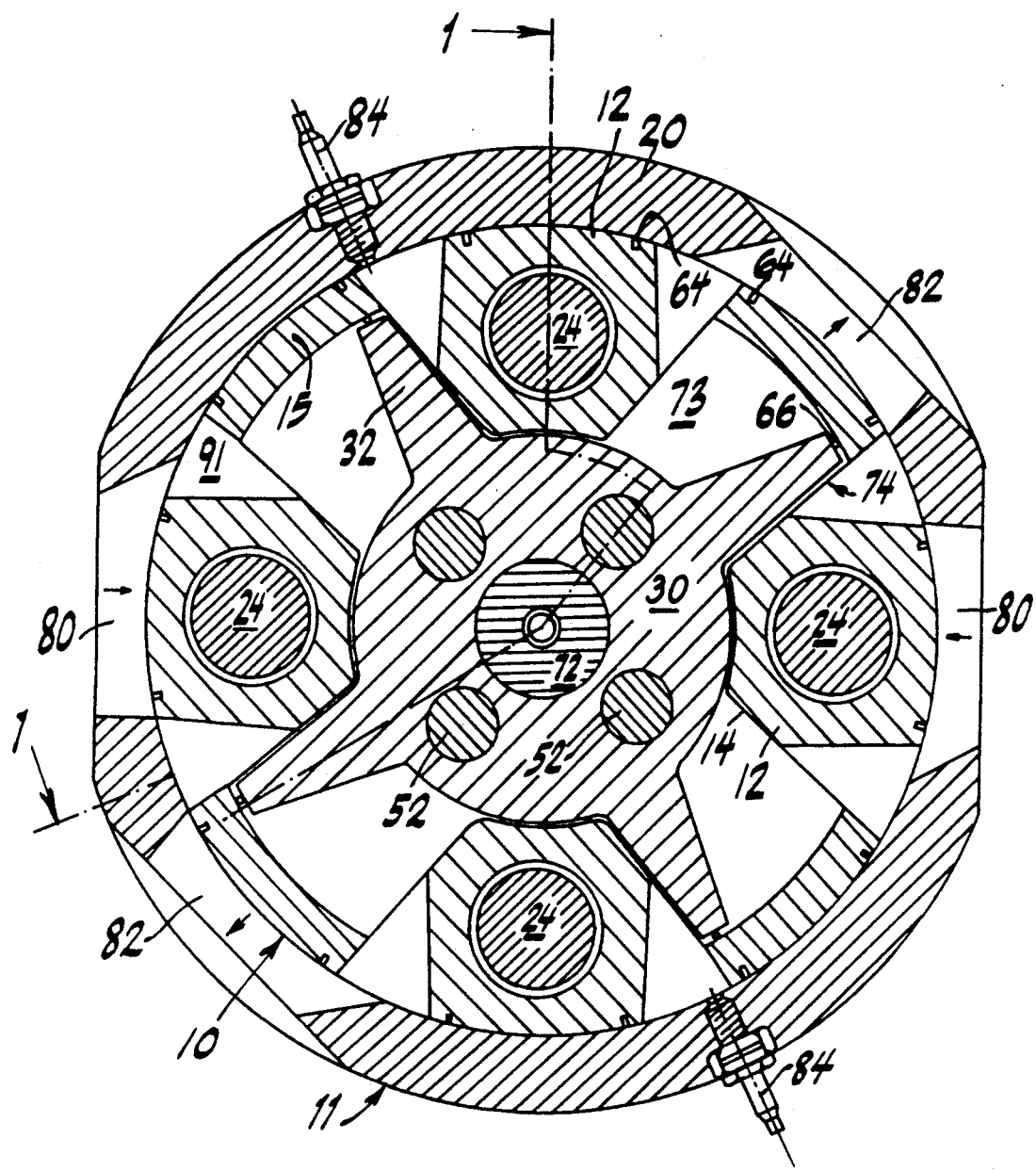
FIG. 2 shows a cross-section along the cross-sectional line 2—2 of FIG. 1.

In the case of the embodiment shown in FIGS. 1 and 2, the elastic connection is formed using approximately forty cylindrical connector bolts 36 made of steel, which engage in blind holes 38 of the housing cover 40, which consists of aluminum, at their one end 33, and in axial bores 29 of the ring gear 28, which consists of steel, at their other end 35. The parts 33 of the bolts 36 which engage in the blind holes 38 of the housing cover 40 have a greater diameter than the parts 35, which are inserted to fit tightly into bores 29 of the ring gear 28. The parts 33 are furthermore provided with a rubber elastic coating 31, which lies close against the wall and the base of the blind holes 38 in the unstressed state, and which is adapted to the stresses which occur, in terms of material strength and Shore hardness. The hole circle diameter of the blind holes 38 in the housing cover 40, which is a diameter of a circle passing through the centers of the blind holes 38, is selected to be slightly smaller, at ambient temperature, than the hole circle diameter of the bores 29 in the ring gear 28. As a result, compression of the elastic coating 31 occurs only in the cold state of the engine, which is compensated in the operating state due to the difference in heat expansion of the housing cover 40 and the ring gear 28, and which, therefore, is not superimposed on the reciprocal stresses during operation, which result from operation.

Figure 3:
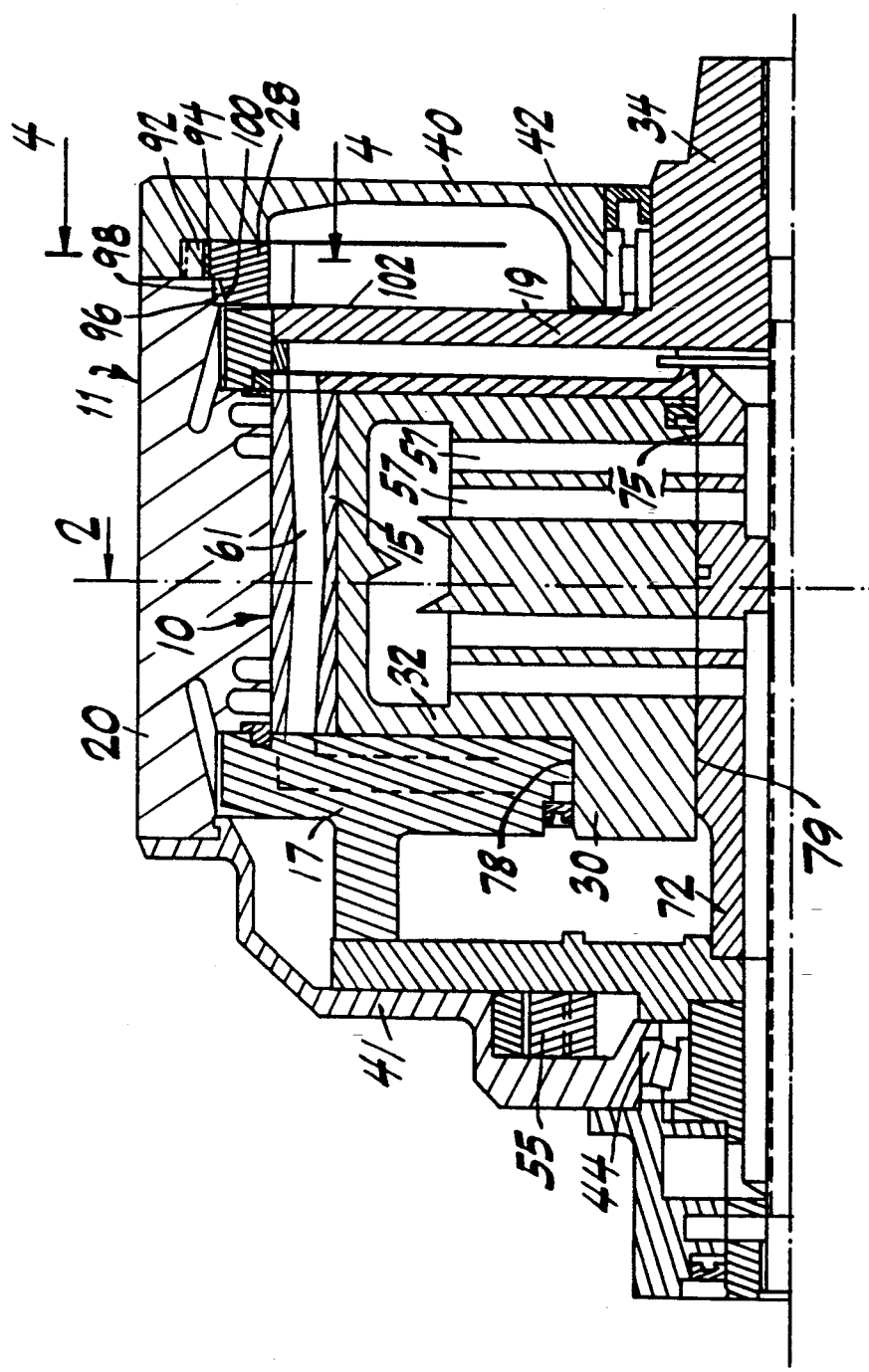
FIG. 3 shows a different embodiment of a rotation piston internal combustion engine than that shown in FIG. 1, in a longitudinal cross-section cut in half.
Figure 4:
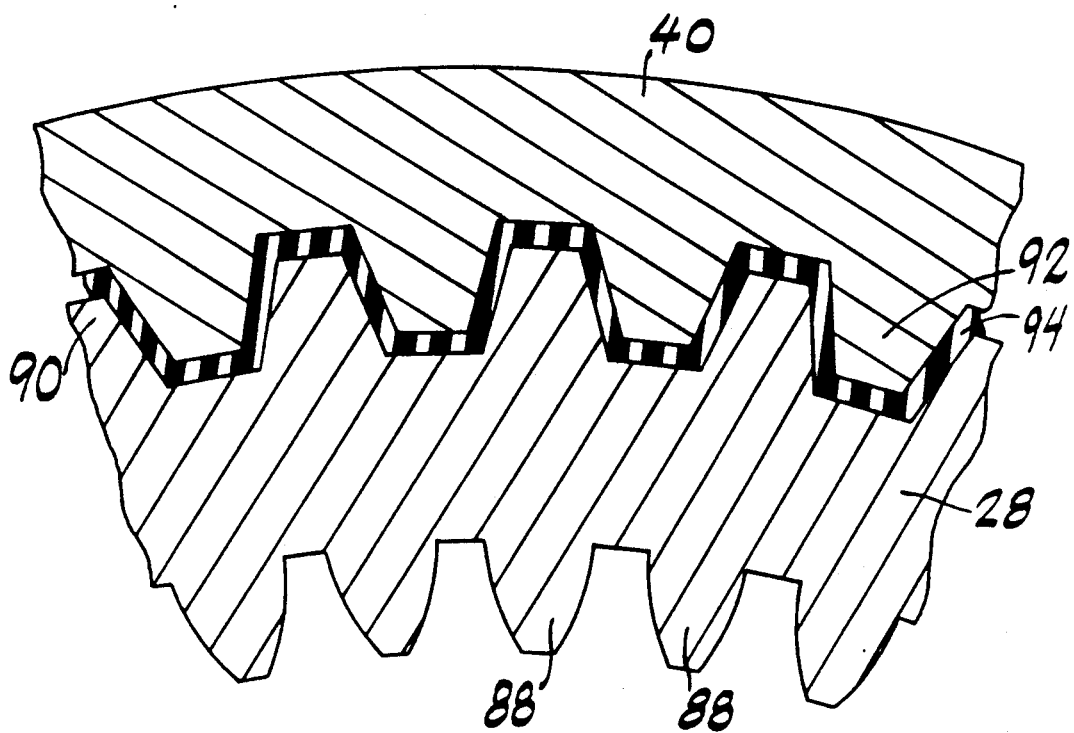
FIG. 4 shows a cross-section along the cross-sectional line 4—4 of FIG. 3.

In the embodiment shown in FIGS. 3 and 4, the ring gear 28 is provided with a wedge gearing 90 directed radially outward, which meshes with an inside gearing 92 on the housing cover 40, leaving a continuous gap. In the gap between the two gearings 90, 92, there is a damping layer 94 made of an elastomer material, which guarantees an elastic connection between the ring gear 28 and the housing cover 40. In the embodiment shown in FIG. 4, a damping layer 94 connected in the circumference direction is provided, where material which contracts in the stressed state will primarily expand in an axial direction. Basically, however, it is also possible to interrupt the damping layer 94, forming free interstices in the circumference direction, so that the displaced material can penetrate into the corresponding cavities in the stressed state. The damping layer must demonstrate sufficient wall thickness, particularly in the area of the gear tooth profile, so that the shear forces which occur during impact stress can be absorbed.

Instead of the circumference gearing shown in FIGS. 3 and 4, surface gearing between the ring gear 28 and the housing cover 40, bridged by a damping layer, is also possible, although it is not shown in the drawing. If the rubber elastic damping layer is vulcanized into the gap, producing a sufficient adhesion bond, it is even possible to do without any gearing between the ring gear 28 and the housing cover 40.

A spring elastic ring 96, which is placed into an inside groove 98 of the housing 20, with double its width, and which rests against an inside shoulder 100 of the ring gear 28, ensures that the ring gear 28 is held in place so it cannot shift in an axial direction, and that an axial gap 102 remains clear between the fixed ring gear 28 and the frontal side part 19 of the rotor 10.

To bring in coolant and lubricant oil, there is a pipe 47 which passes axially through the engine in both embodiments, from which the oil is directly supplied to the rotor bearings 42, 44 as well as to the crankshaft bearings 56 and 58. The oil gets to the cooling coils 57 arranged in the pistons 32, and to the cooling channels 61 arranged in the outside wall 15 of the rotor 10, through the ring channel 49 which surrounds the axial pipe 47. For this purpose, the oil is circulated by means of a gear wheel pump 55 structured as a sickle pump.

What is claimed is:

1. A rotation piston internal combustion engine comprising:
   a substantially stationary housing defining a plurality of blind holes, each blind hole defining a first diameter and being separated relative to each other by a substantially equal distance;
   a rotor rotatably mounted within the housing for rotation at a substantially uniform velocity about an axis, and including at least four ribs directed substantially radially inward and spaced a substantially equal distance from one another;
   a hub rotatably mounted within the rotor for rotation about the axis at a non-uniform velocity and including at least four pistons projecting radially outward from the hub and spaced a substantially equal distance from one another, each piston being located between two adjacent ribs for oscillating between the two respective ribs;
   at least four gear wheels;
   at least four crankshafts, each crankshaft being rotatably mounted through a respective rib and being coupled to a respective gear wheel for rotation with the crankshaft;
   at least four connecting rods, each being coupled between the hub and a respective crankshaft for rotatably driving the respective crankshaft;
   a ring gear coupled to the housing for engaging the gear wheels to permit rotation of the gear wheels relative to the housing, the ring gear including a plurality of apertures having a second diameter, each aperture corresponding in position to a respective blind hole in the housing; and
   a plurality of connector bolts mounted so that one end of each connector bolt is engaged in a blind hole of the housing and the other end of each connector bolt is engaged in a corresponding aperture of the ring gear, and each connector bolt includes an elastic coating over the end engaged in the blind hold of the housing to form an elastic coupling between the ring gear and the housing.

2. A rotation piston internal combustion engine according to claim 1, wherein the blind holes define a first hole circle passing through the centers of the blind holes and wherein the apertures define a second hold circle passing through the centers of the apertures, and wherein the diameter of the first hole circle is smaller than the diameter of the second hole circle.

3. A rotation piston internal combustion engine according to claim 1, wherein the ring gear is made of a first material and the housing is made of a second material having a different coefficient of thermal expansion than the first material, and wherein the blind holes define a first hole circle passing through the centers of the blind holes and wherein the apertures define a second hole circle passing through the centers of the apertures, and the ratio of the diameter of the first hole circle to the diameter of the second hole circle has a predetermined value at a predetermined operating temperature.

4. A rotation piston internal combustion engine according to claim 3, wherein the diameter of the first hole circle is substantially equal to the diameter of the second hole circle at a predetermined operating temperature.

5. A rotation piston internal combustion engine according to claim 1, wherein each end of each connector bolt is generally cylindrical and the diameter of each end which engages a blind hole is greater than the diameter of the other end which engages a corresponding aperture of the ring gear.

6. A rotation piston internal combustion engine according to claim 1, wherein the elastic coating of each connector bolt is engaged with a surface defining the respective blind hole in the unstressed state.

7. A rotation piston internal combustion engine according to claim 1, comprising at least 30 connector bolts.

8. A rotation piston internal combustion engine according to claim 1, wherein the elastic coating of each connector bolt is securely attached to the respective connector bolt.

9. A rotation piston internal combustion engine according to claim 8, wherein the elastic coating is vulcanized onto the connector bolts.

* * * * *

UNITED STATES PATENT AND TRADEMARK OFFICE
CERTIFICATE OF CORRECTION

PATENT NO. : 5,324,182
DATED : June 28, 1994
INVENTOR(S) : Sabet, et al.

It is certified that error appears in the above-indentified patent and that said Letters Patent is hereby corrected as shown below:

In column 6, line 3, change "hold" to -- hole --;

In Column 6, line 8, change "hold" to -- hole --.

Signed and Sealed this

Twenty-eight Day of March, 1995

Attest:

BRUCE LEHMAN

*Attesting Officer*        *Commissioner of Patents and Trademarks*